(12) United States Patent
Steiner (10) Patent No.: US 9,888,350 B2
(45) Date of Patent: Feb. 6, 2018

(54) SYSTEM, METHOD AND APPARATUS FOR HYBRID WIRELESS FINE-TIMING MEASUREMENT

(71) Applicant: Intel IP Corporation, Santa Clara, CA (US)

(72) Inventor: Itai Steiner, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 54 days.

(21) Appl. No.: 14/979,106

(22) Filed: Dec. 22, 2015

(65) Prior Publication Data

US 2017/0180933 A1    Jun. 22, 2017

(51) Int. Cl.
*H04W 4/02*      (2009.01)
*H04L 12/26*     (2006.01)

(52) U.S. Cl.
CPC ......... *H04W 4/023* (2013.01); *H04L 43/0852* (2013.01)

(58) Field of Classification Search
CPC .......................... H04W 4/023; H04L 43/0852
See application file for complete search history.

(56) References Cited

U.S. PATENT DOCUMENTS

| | | | | |
|---|---|---|---|---|
| 8,918,117 | B2 * | 12/2014 | Rochberger | H04W 64/00 455/456.1 |
| 9,226,260 | B2 * | 12/2015 | Steiner | H04W 64/00 |
| 2014/0187259 | A1 * | 7/2014 | Kakani | H04W 64/00 455/456.1 |
| 2014/0335885 | A1 * | 11/2014 | Steiner | H04W 64/00 455/456.1 |
| 2016/0021495 | A1 * | 1/2016 | Segev | H04W 40/20 455/456.3 |
| 2016/0050530 | A1 * | 2/2016 | Corbalis | G06Q 20/3278 455/456.1 |
| 2016/0183042 | A1 * | 6/2016 | Weizman | H04W 4/02 455/456.1 |
| 2016/0183185 | A1 * | 6/2016 | Radhakrishnan | H04W 52/0209 370/311 |
| 2017/0013412 | A1 * | 1/2017 | Steiner | H04W 64/00 |
| 2017/0045627 | A1 * | 2/2017 | Larsson | G01S 19/51 |

* cited by examiner

*Primary Examiner* — Brandon Miller
(74) *Attorney, Agent, or Firm* — Alpine Technology Law Group LLC (57) ABSTRACT

The disclosure relates to time-of-flight (TOF) positioning and device location within a wireless networks using a hybrid combination of Bluetooth Low Energy (BLE) and Wi-Fi signaling. In one exemplary embodiment, a hybrid responder engages in BLE discovery and negotiation with a mobile device seeking its location. The hybrid responder may engage its WiFi platform only to conduct the FTM procedure. By keeping the WiFi platform in deep sleep or Off mode, the hybrid responder can gain significant power savings.

28 Claims, 8 Drawing Sheets

SYSTEM, METHOD AND APPARATUS FOR HYBRID WIRELESS FINE-TIMING MEASUREMENT

BACKGROUND

Field

The disclosure generally relates to system, method and apparatus for conducting Fin-Timing-Measurement (FTM). Specifically, the disclosed embodiments relate to time-of-flight (TOF) positioning and device location determination within a wireless networks using a hybrid combination of Bluetooth Low Energy (BLE) and Wi-Fi signaling.

Description of Related Art

Accurately locating wireless network devices may incur a computational cost associated with performing numerous location determinations from multiple terrestrial sources. The computational cost may impact other processing activities of a device and also incur additional power consumption, which may degrade the performance or usability of the device. Thus, there are general needs for systems and methods to reduce the costs associated with accurately locating a wireless device.

BRIEF DESCRIPTION OF THE DRAWING'S

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and WiFi FTM Responder-Capable device.

Some embodiments may be used in conjunction with devices and/or networks operating in accordance with existing Institute of Electrical and Electronics Engineers (IEEE) standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Outdoor navigation has been widely deployed due to the development of various systems including: global-navigation-satellite-systems (GNSS), GPS, Global Navigation Satellite System (GLONASS) and GALILEO. Indoor navigation has been receiving considerable attention. Indoor navigation differs from outdoor navigation since indoor environment is not capable of receiving signals from global satellites. As a result, conventional techniques do not offer a scalable solution with acceptable precision.

Various techniques and configurations described herein provide for a location discovery technique used in conjunction with wireless communications and network communications. The presently described location techniques may be used in conjunction with wireless communication between devices and access points. For example, a wireless local area network (e.g., Wi-Fi) may be based on, or compatible with, one or more of the IEEE 802.11 standards.

With some network technologies, establishing the location of a device makes use of WiFi FTM calculations to calculate the distances between the device and multiple access points. For example, a device may request TOF information from two or more access points in order to establish a physical distance from each individual access point, and thereby determining an approximate physical location of the device with respect to the access points. In an example where the physical location of the access points is known, the access points may provide the device with that location information such that the device, alone or in conjunction with the access points, may determine a precise physical location of the device, for example, as a set of latitude and longitude values in a navigational coordinate system.

In connection with the presently described techniques, a hybrid wireless communications device is utilized to establish a connection with a wireless communications access point. In an example, an IEEE 802.11 standard (e.g., IEEE 802.11v) may define a frame exchange from which ToF can be determined assuming availability of a mobile device to receive a response at all times. ToF calculations may take few milliseconds, forcing the mobile device to dwell on the requested channel until a response arrives thereby consuming additional power. Further, ToF calculation resources may not be available at all times due to prior interaction between the device and the recipient access point. The unavailability may be due to resource allocation from one side (or both sides) to upcoming ToF measurement exchange.

An exemplary method for ToF positioning includes an FTM procedure performed by an initiating station and a responding station. The FTM procedure is extensively defined at IEEE 802.11 REVmc/D4 (January 2015) Standard and is incorporated herein for background information. The method may comprise a first stage (stage I) for negotiating comeback timing for a next FTM exchange; a second stage (stage II) that includes performing a fine-timing measurement exchange, and optionally negotiating the comeback timing for a next fine-timing measurement exchange; and a third stage (stage III) that includes reporting and polling the timestamps of the previous fine timing measurement exchanges, and optionally performing an additional fine-timing measurement stage. These location techniques may provide a ToF responder, for example an access point, with capability to manage and prepare required ToF resources. They may also provide an FTM Initiator (e.g., a STA or a mobile device) ability to perform parallel operations while waiting for responder resources. Such operations may include: power save, performance of additional ToF requests with another responder, handling of serving channel traffic, etc.

Conventional TOF and FTM procedures assume that the responder STA is always be available to receive incoming management frames on the selected channel. The incoming management frames utilize WiFi communication mode. This is highly inefficient for battery-powered devices. To conserve power, especially when no active client is using the FTM responder STA, the device may maintain a deep-sleep mode where it does not receive incoming traffic. However, conventional standards (e.g., WLS-SIG/802.11) require continual listening from the responder STA to accept incoming FTM-request frames. The conventional standards do not lend themselves to battery-powered devices.

To overcome these and other deficiencies, an embodiment the disclosure is directed to method, system and apparatus which incorporate both BLE beacon and 802.11 WiFi FTM responder features and/or capabilities. In certain embodiments, the disclosure is directed to a hybrid FTM/BLE responder device. The BLE radio in a hybrid FTM/BLE responder device may be used for device discovery (by the initiating mobile device/client) and to perform the negotiation phase of WiFi FTM on top of (o after) a BLE connection and exchange.

In certain embodiments, the disclosed embodiments enable the WiFi receiver to be completely off (e.g., deep sleep or power save modes) until an FTM measurement is needed by a client. This power-optimization will enable the responder to save power during times when no clients are in its vicinity and turning on WiFi only when an initiating client has issued a request by BLE signaling. The BLE advertisement and BLE's power efficiency provide a better medium for negotiating FTM measurements than conventional WiFi medium. This remains true for both ASAP and non-ASAP FTM modes since both modes start with negotiation phase (i.e., issuing an FTM Request) from the initiator device. In one embodiment, the negotiating phase may be implemented by BLE signaling while the measurement phase may be done using WiFi communication mode. In addition to significant power saving, using BLE connection for certain phases of the FTM operation enhances security and authentication which is conventionally lacking over WiFi FTM in non-associated mode.

One application of the hybrid WiFi FTM/BLE responder (herein, hybrid FTM responder) is to advertise BLE beacons. Advertising BLE beacons has modest and limited power consumption affect. A nearby client may connect and negotiate a WiFi FTM session using the BLE medium, radio and frames. The BLE frames are power efficient due to minimal data/frame exchange and low throughput. Only when negotiation is done or is in progress, the responder device will enable its WiFi radio to receive FTM frames over WiFi. In certain embodiments, the WiFi radio may be engaged to conduct the actual measurements. This will enable the beaconing device (i.e., the hybrid FTM responder) to completely shut off its WiFi radio or leave the WiFi receiver path completely disabled for most of the time. The WiFi receiver may be enabled only when a client (e.g., a mobile device) actually needs to conduct measurements and requires the WiFi FTM services.

The disclosed embodiments may significantly reduce the overall power consumption, as the FTM/WiFi will now introduce only very minimal addition to the BLE advertising power budget. The power consumption will be relative to the actual utilization of the FTM by the surrounding dynamic clients. In one embodiment, the system may choose to revert back to standard WiFi FTM when several clients are actively using the system in a short duration.

Figure 1:
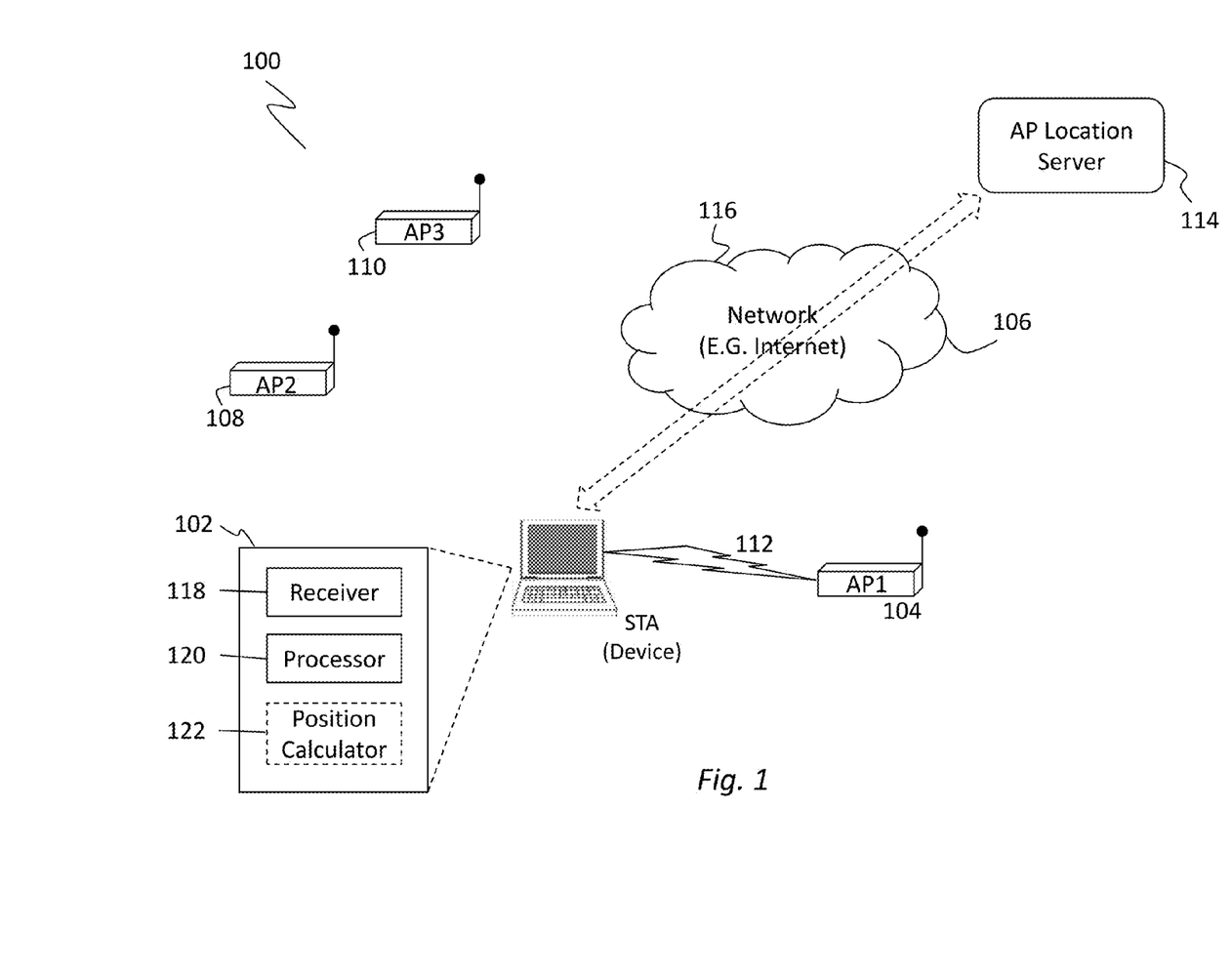
FIG. 1 shows an exemplary environment for hybrid location determination according to one embodiment of the disclosure.

FIG. 1 shows an exemplary environment for hybrid location determination according to one embodiment of the disclosure. In FIG. 1, communication system 100 may include device 102 which is capable of wireless communication. Device 102 may be a user equipment (UE) or a communication station (STA). Device 102 may include a receiver 118 (e.g., as part of a transceiver) and a processor 120. Processor 120 may be any hardware, or subset of hardware and software, that can perform the specified operation. Processor 102 may be a virtual hardware.

Processor 120 may be arranged to communicate with a position calculator 122. In an example, position calculator 122 may be local to (e.g., a part of, integrated with, belonging to, etc.) device 102. In an example, position calculator 122 is remote from (e.g., distant, accessible indirectly via a network (e.g., 106), in a different machine (e.g., server 114) from device 102. When local, processor 120 may communicate with position calculator 122 via an interlink (e.g., bus, data port, etc.) When remote, processor 120 may communicate with the position calculator via a network interface, such as via network interface card (NIC), or a wireless transceiver. In an example, device 102 may be a mobile computing device such as a cellular phone, a smartphone, a laptop, a tablet computer, a personal digital assistant or other electronic device capable of wireless communication.

First access point (AP1) 104 may, for example, be a base station or a fixed wireless router. In one embodiment, the AP (or FTM Responder) may include WiFi STA and/or AP capabilities (partially or full). In another embodiment, the AP (or FTM Responder) may also include BLE capabilities. As used herein, an AP may optionally comprise an FTM or an FTM Hybrid Responder. Device 102 may establish a communication link 112 with the first access point 104 in order to reach network 106, such as the Internet. In an example, device 102 may communicate with AP locations server 114 via a link 116 over any available connection. For example, device 102 may communicate with AP locations server 114 via the link 116 through first AP 104 and network 106. Link 116 may, for example, utilize HyperText Transfer Protocol Secured (HTTPS) and transport layer security (TLS) to prevent the interception or unauthorized manipulation of data exchanged between the device 102 and the access point locations server 114. In an example, a cellular base station may provide the link 116 between device 102 and access point locations server 114.

In an example, a second AP 108 or a third AP 110 may be within range of device 102. Device 102 may communicate with the first AP 104, the second AP 108 (AP2) or the third AP 110 (AP3). Device 102 may request location information regarding one or more of the first AP 104, the second AP 108, the third AP 110 or from the AP location server 114. In one exemplary embodiment, the AP location server may provide location of the APs (i.e., the device may query location of the AP/Responder from the responder itself). In response to the location information request, AP location server 114 may provide device 102, via link 116, with the location information corresponding to the requested access point. In an example, device 102 may initiate an FTM Request (e.g., a stage I negotiation of comeback timing) with the AP 104. The first AP 104 may respond to the FTM request and allocate resources to perform a ToF measurement exchange. In some exemplary embodiments, AP location server 114 may not be used and its functions may be distributed to one or more APs.

A primary application of FTM may be to help determine location of the mobile device. Other use applications may include determining the proximity of the mobile-device to the responder (without actually determining the location of the mobile device) or helping proximate distance between the mobile device and an FTM responder.

In one embodiment, the FTM measurement process comprises six steps. (1) BLE Advertisement—At this step, the responder STA (i.e., a hybrid WiFi FTM/BLE device) may advertise/beacon its presence over BLE link while keeping its WiFi off or in deep sleep mode. (2) BLE Discovery—During BLE discovery an initiating STA such as a mobile device periodically scans for BLE signals and discovers the responder STA. (3) BLE Connection—During the BLE connection phase, the mobile device establishes a BLE connection with the responder STA to conduct WiFi FTM with the device. (4) FTM Negotiation over BLE Connection—Here, the mobile device may negotiate with the responder to establish the WiFi FTM procedure. In certain embodiments of the disclosure, the steps 1-4 may be implemented using the BLE connection while maintaining the WiFi connection at deep sleep or Off modes. This results in significant consumption efficiency for the Responder. (5) WiFi FTM Procedure—At this stage, the responder STA and the mobile device may switch to WiFi communication mode and continue with the FTM procedure to produce accurate range calculation. (6) WiFi FTM Measurement Results—Here, the responder and the mobile device will continue the FTM procedure, optionally, over BLE (for security) or over WiFi to get measurement timers. The result of FTM procedure is an accurate FTM timer(s) that indicates at both sides (i.e., initiator and responder) the time of departure and time of arrival of the packets. In order to calculate range, the initiator needs to get the FTM timers from the responder (after the actual measurement has taken place). The sixth step may be optional.

During the advertisement by the hybrid responder, the responder may periodically send BLE advertisement with its universally unique identifier (UUID). The BLE advertisement may optionally indicate its WiFi FTM Responder capability. This information may be embedded in the single advertisement. For example, the information may be included as part of the vendor-custom manufacturer specific data field. The information may be made available to any client device performing BLE passive scanning. In another embodiment, the information may be embedded in an additional broadcast message (BLE scan response data) that will be sent upon receiving BLE scan request from a client (BLE active scanning).

In case where the responder is not sending WiFi beacons, additional WiFi PHY and MAC layer parameters may be needed for FTM implementation. Such parameters may include WiFi Base Station Identification (BSSID), Channel, Bandwidth, Control channel, etc. In one embodiment of the disclosure, these additional information may also be embedded in the BLE broadcast messages.

During the BLE connection step and upon discovering the responder STA, the mobile device may determine whether it needs to conduct an FTM procedure and self-locate. The mobile device (client/initiator) may then may connect (as master) to the responder (as peripheral/slave) using conventional BLE connection establishment procedures.

In one embodiment of the disclosure, the responder saves power by acting as BLE peripheral (slave). The responder can set the BLE Generic Access Profile (GAP) connection parameters, such as Slave Connection Interval and Slave Connection Latency. BLE GAP connection parameters define the number of consecutive connection events during which the peripheral device (i.e., the responder), is not required to listen to the mobile-device (BLE master) and therefore is able to maintain the BLE radio turned off. This reduces its availability for connection events (e.g., every 200 ms) yet fully complies with the required responsiveness to thereby effectively balance between power-budget and responsiveness.

An additional benefit of the BLE connection disclosed herein is that the connection is both light-weight (in comparison with BT or WiFi) and secure. Thus, the disclosed embodiments provide provisioning of the FTM procedure only for registered clients/responders and thereby conserve energy and provide an additional layer of security.

Figure 2:
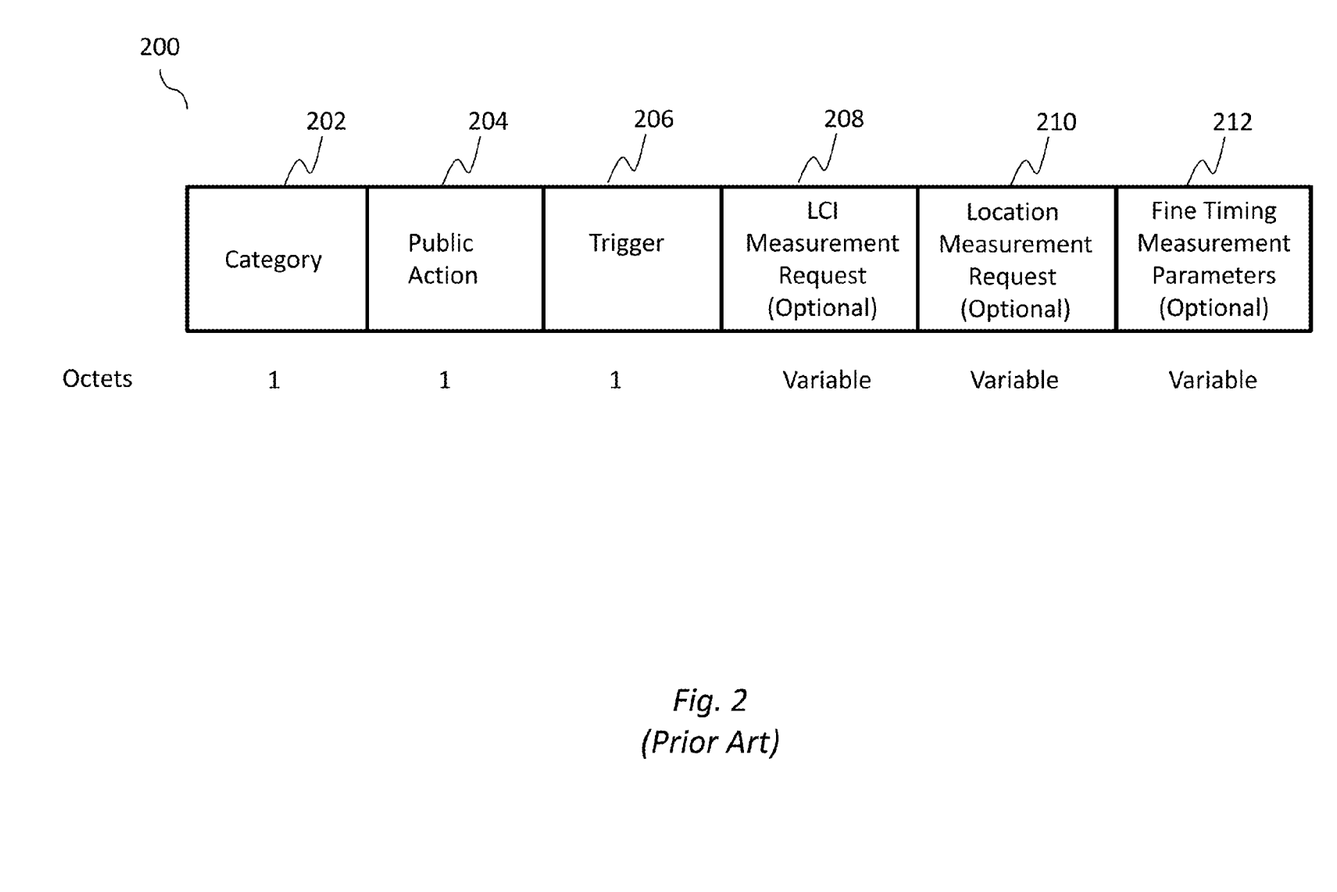
FIG. 2 shows a conventional FTM Request Action field Format.

In one embodiment, in order to negotiate FTM session the initiator may send an FTM Request Frame to the responder over BLE communication mode. The FTM Request Frame may be a conventional frame as shown in FIG. 2. Specifically, FIG. 2 shows a conventional FTM Request frame 200 including: category 202, public action 204, trigger 206, optional LCI measurement request 208, optional location measurement request 210, and optional FTM parameters 212. FIG. 2 also shows the bit/octet content of each portion of Frame 200. Packet 200 is consistent with the Frame structure under IEEE 802.11 REVmc/D4 (January 2015) standard.

The Category field 202 is set to the value for Public as defined in Section 8.6.8.1 of the IEEE 802.11 REVmc/D4 (January 2015) Standard. The Trigger field 204 set to 1 indicates that the initiating STA requests that the responding STA start or continue sending Fine Timing Measurement frames. The Trigger field set to 0 indicates that the initiating STA requests that the responding STA stop sending Fine Timing Measurement frames. The LCI Measurement Request field 208 may be optionally present. If present, it contains a Measurement Request element 210 with Measurement Type equal to LCI, which indicates a request for a Measurement Report element with Measurement Type equal to LCI. The Enable bit in the Measurement Request Mode 210 field in the Measurement Request element may be set to 0. The Location Subject field in the Measurement Request field of the Measurement Request element may be set to Location Subject Remote. FTM Parameters field 212 may be optionally present and it may include various parameters relating to the FTM measurement.

Figure 3:
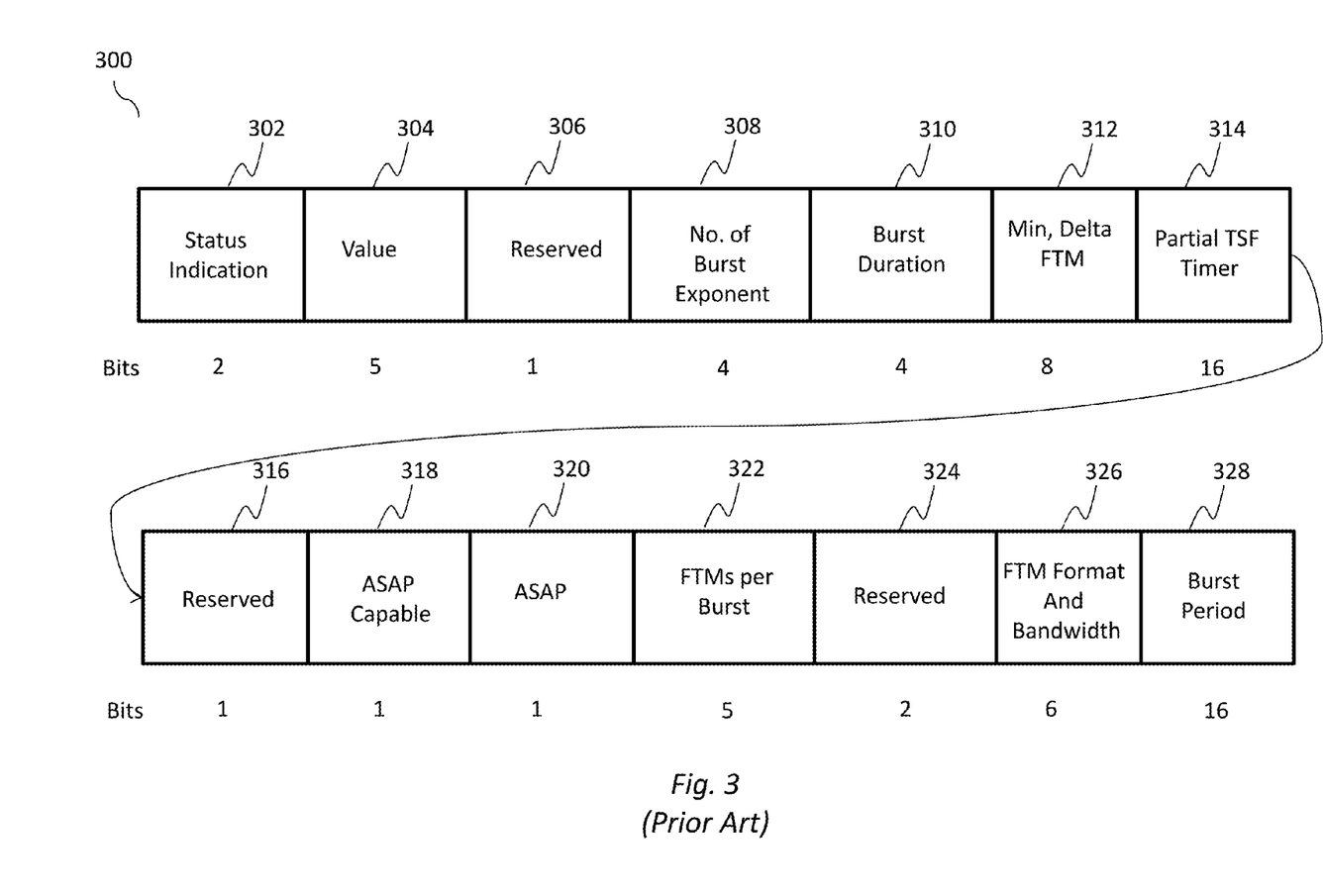
FIG. 3 shows a conventional FTM Parameter element format.

FIG. 3 shows a conventional FTM Parameter element format (FTM Measurement Parameters 212, FIG. 2). It should be noted that frames 200 and 300 are exemplary and are configured to take measurement format from WiFi mode into BLE mode for communication during the FTM negotiation over BLE connection. Frames 200 and 300 are exemplary of the information elements that WiFi FTM frames may contain. Each frame may be passed as a whole (i.e., payload) inside one or several BLE frames (BLE frames are short and several BLE frames may be needed to send the payload of one FTM frame). The description of each of frames 200 and 300 is extensively provided at IEEE 802.11-REVmc/D4 (January 2015) Standard and is incorporated herein in its entirety for background information.

In order to initiate a fine timing measurement procedure, a STA that supports the fine timing measurement procedure as an initiator (referred to as an initiating STA) shall transmit a Fine Timing Measurement Request frame. This frame is called the initial Fine Timing Measurement Request frame. Frame 300 of FIG. 3 is a continuous frame but is shown in two parts to fit the page. The number of bits per each segment of frame 300 is also shown. Field 302 is the fame status indication which indicates the responding STA's response to the Fine Timing Request. Field 304 defines the frame value. Field 306 is reserved for future uses. Field 308 is the Number of Bursts Exponent field and it indicates how many burst instances are requested for the FTM session. Field 310 defines the duration of each burst instance relating to field 308. Field 312 defines the minimum time between consecutive Fine Timing Measurements. The Partial TSF Timer field 314 in an initial Fine Timing Measurement frame indicates the partial value of the responding STA's TSF timer at the start of the first burst instance of an FTM session. Field 316 is reserved for future use.

The ASAP Capable field 318 indicates whether the STA is capable of capturing timestamps associated with an initial Fine Timing Measurement frame and sending them in the following Fine Timing Measurement frame. This field is reserved in the initial Fine Timing Measurement Request frame. The ASAP field 320 indicates the initiating STA's request to start the first burst instance of the FTM session as soon as possible. When the ASAP field is set to 0 by an initiating STA, the initiating STA requests the start of the first burst instance specified by the Partial TSF Timer field in the Fine Timing Measurement Request frame. When the ASAP field is set to 1 by an initiating STA, the Partial TSF Timer field in the Fine Timing Measurement Request frame indicates the requested start of the first burst instance if the ASAP field is set to 0 in the initial Fine Timing Measurement frame.

The FTMs per Burst field 322 indicates how many successfully transmitted Fine Timing Measurement frames are requested per burst instance by the initial Fine Timing Measurement Request frame, or allocated by the initial Fine Timing Measurement frame, respectively. Field 324 is reserved for future use. The FTM Format And Bandwidth field 326 indicates the requested or allocated packet format and bandwidth used by all Fine Timing Measurement frames in an FTM session. The Burst Period field 328 indicates the interval between two consecutive burst instances, in units of 100 msec. The value 0 indicates no preference by the initiating STA. This field is reserved when the Number of Bursts Exponent field is set to 0.

In one embodiment of the disclosure the exchange of FTM parameters may be materialized over a BLE connection and in accordance with the BLE convention and methods for data-exchange. The responder may enable it via BLE server (e.g., Server 114, FIG. 1) in communication with the responder and the mobile device. The BLE Server may comprise a Generic Attribute Profile (GATT).

In certain embodiments, the BLE GATT profile may be implemented to include messaging element from WiFi FTM parameters into BLE communication packets. An exemplary implementation definition may include: (1) a New BLE GATT Profile/Service for WiFi FTM Responder, and (2) a New BLE GATT Characteristics.

The new BLE GATT Characteristics may include WiFi FTM responder General Parameters indicating ability to conduct FTM negotiation over BLE and/or WiFi and containing WiFi parameters needed to establish WiFi FTM (pre-association frame exchange). In one embodiment, the parameters may include WiFi BSSID, Channel/frequency, Bandwidth, Control channel/frequency, TSF-timer, etc. The information may be Read-Only.

FTM Request may be issued during the FTM negotiation between the mobile device and the responder. The FTM request may contain Information Elements (IEs) similar or identical to conventional FTM Request and FTM Parameters fields as presented in FIGS. 2 and 3. This information may be Write-Only.

FTM Response which may be relevant to non-ASAP mode. This portion of the packet may be exchanged as part of the FTM BLE negotiation phase and it may contain IEs similar to conventional FTM Response fields. This portion may be Read-Only.

A new BLE GATT profile may be introduce to support FTM responder devices according to the disclosed embodiments. In an alternative embodiment, a vendor-specific profile may introduce consistent with disclosed principles to include the above characteristics, parameters and services. After completing the negotiation phase over the BLE connection, the BLE connection may be discontinued and the remaining FTM procedure may be continued by WiFi. The disclosed implementation frees the BLE platform of the responder to accept new connection requests from other clients and/or initiators.

Figure 4:
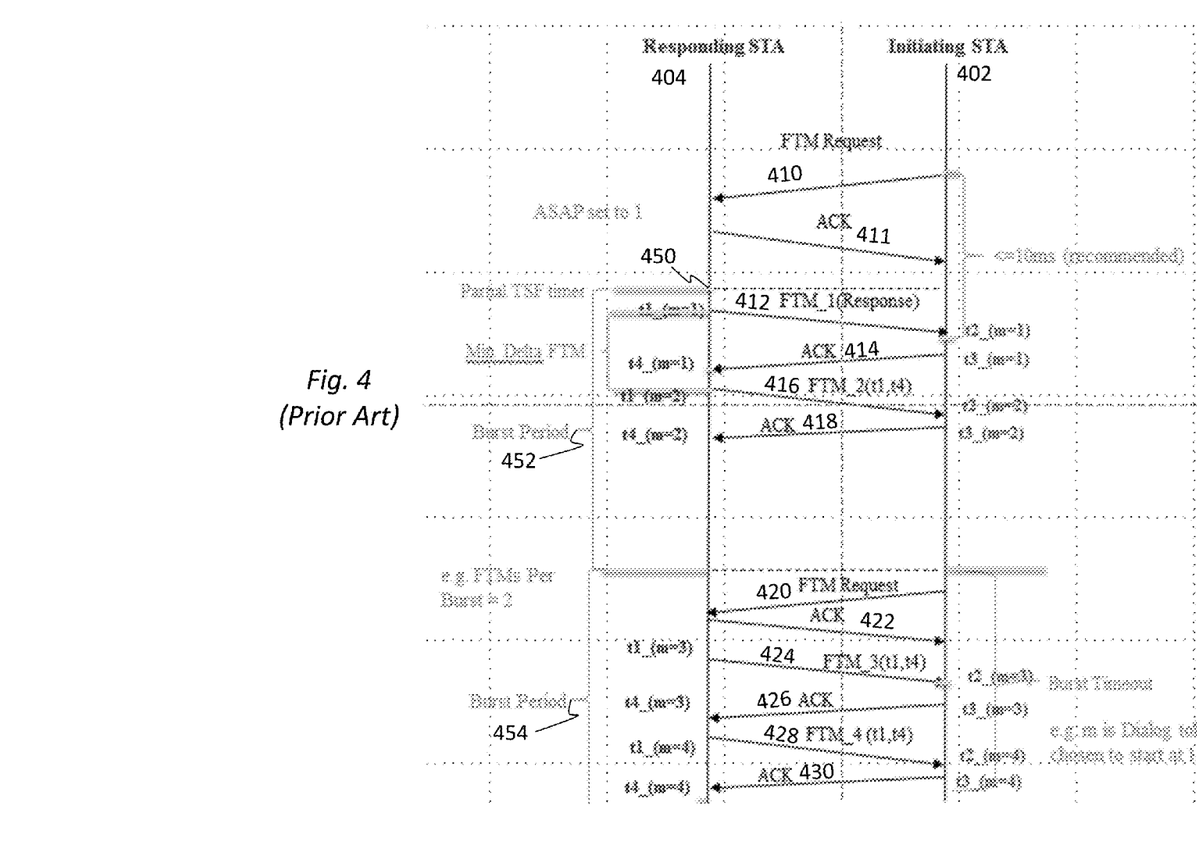
FIG. 4 shows a conventional FTM procedure using WiFi as the exclusive communication platform for an ASAP FTM inquiry.

FIG. 4 shows the conventional FTM procedure using WiFi as the exclusive communication platform. In FIG. 4, initiating device 402 may be a mobile device seeking to determine its location in an environment. The process starts when initiating STA 402 receives and BLE advertisement from responding STA 404 and knows of its presence.

Next, initiating STA 402 sends and FTM request to Responding STA 404. Responding STA 404 may be conventional FTM device. At step 411, Responding STA 404 sends an acknowledgement response to initiating STA 402. The FTM request and acknowledgement is followed by step 412 where FTM-1 Response frame is sent to initiating STA 402. The FTM Response frame is described in IEEE 802.11 REVmc/D4 (January 2015) Standard and is incorporated herein in entirety for background information.

In the embodiment of FIG. 4, the ASPA FTM is setting to 1. Accordingly, the FTM measurement is to be done expeditiously. At time 450 a partial time synchronization timer (TSF) starts. TSF timer is conventionally specified in IEEE 802.11 WLAN standard to fulfill timing synchronization between initiator 402 and responding STA 404. The TSF keeps the timers for all stations in the same Basic Service Set (BSS) synchronized.

An acknowledgement packet 414 is sent to responding STA 404. Next, FTM-2 (t1, t4) 416 is sent from responding STA 404 to initiating STA 402.

Acknowledgement packet 418 indicates receipt of FTM-2 packet. During the burst period 452, no further action ensues. FIG. 4 shows two burst periods 452 and 454. A number of FTM measurements can be done at each burst period. In the embodiment of FIG. 4, two FTM measurements are made at burst period 452. At burst period 454, periodic FTM requests 420, 426 and 428 are issue from initiating STA 402. Acknowledgements 422 and FTM-3 424 are issued in response to FTM request 420. Initiating device 402 acknowledges receipt of FTM-3 with Ack 426. FTM-4 is then transmitted from responder 404 to initiator STA 402. Receipt of FTM-3 is acknowledged with ACK packet 430. The conventional FTM process of FIG. 4 tales place in WiFi communication mode and is energy intensive.

Figure 5:
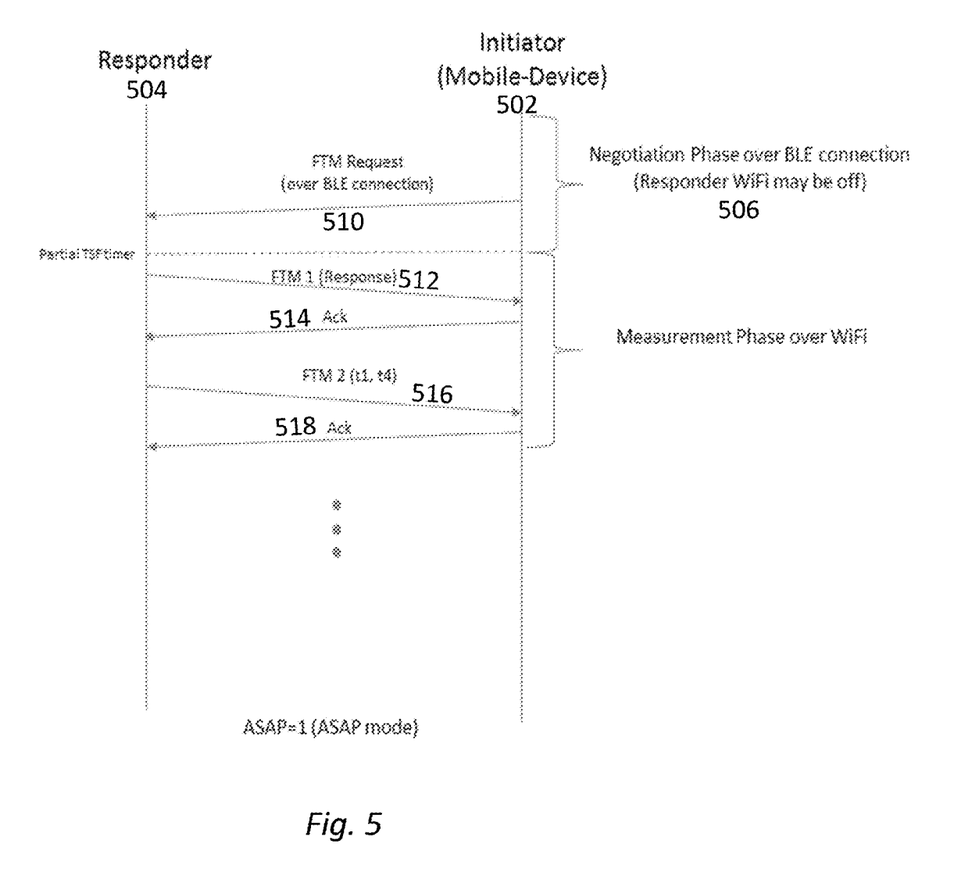
FIG. 5 illustrates timing structure for an exemplary hybrid FTM device according to one embodiment of the disclosure for an ASAP FTM inquiry.

FIG. 5 illustrates timing structure for an exemplary hybrid FTM device according to one embodiment of the disclosure.

In FIG. 5, initiator 502 sends FTM request over BLE connection to responder 504. The FTM request may include packetized data indicating ASAP mode for the inquiry. FTM request 510 may also include FTM information request in the BLE packet. Thus, according to one embodiment of the disclosure the initial FTM negotiation phases are carried out in BLE mode. During the BLE FTM negotiation phase 506, the WiFi platform of responder 504 may be off to conserve power.

At step 512, responder 504 issues FTM-1 in response to the BLE FTM request 510. Initiator 502 sends Acknowledgement 514 to responder 504. FTM-2 may be optionally sent from responder 504 to initiator 502 with Acknowledgement 518 ensuing. In one embodiment of the disclosure steps 512-518, which correspond to the measurement phase of the FTM, are conducted over WiFi communication mode between the WiFi platform of initiator 502 and responder 504.

Figure 6:
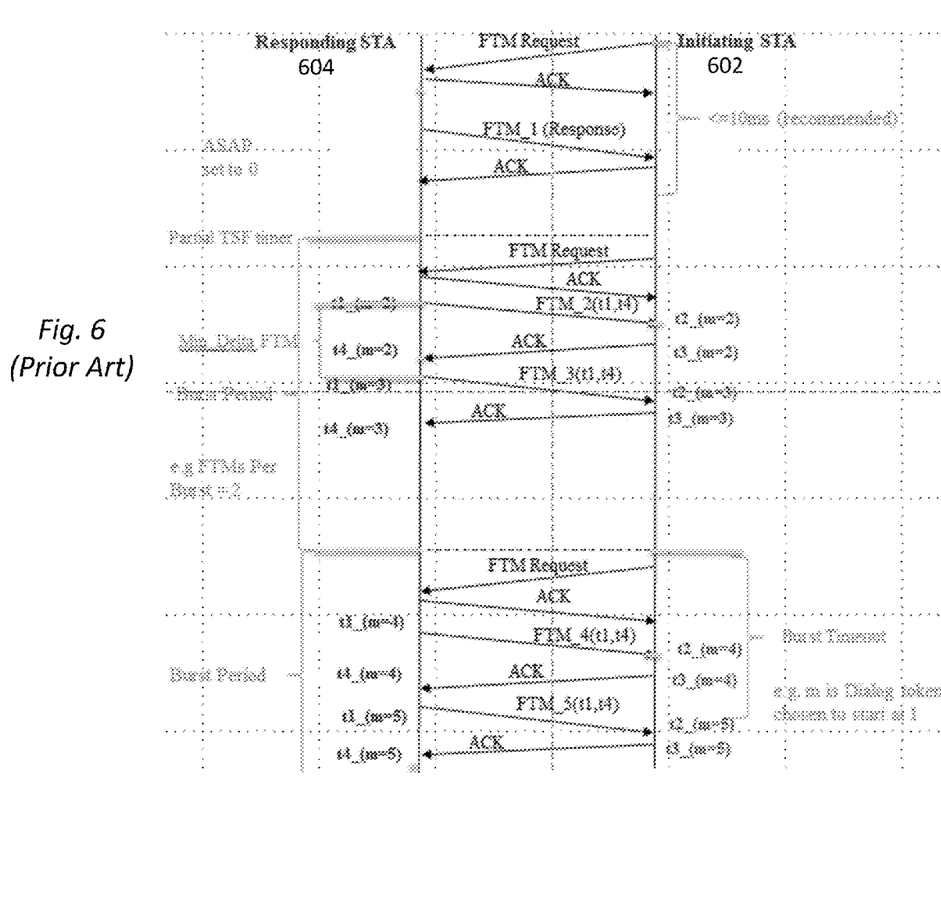
FIG. 6 shows the conventional FTM procedure using WiFi as the exclusive communication platform for a non-ASAP FTM inquiry.

FIG. 6 shows the conventional FTM procedure using WiFi as the exclusive communication platform for an non-ASAP FTM inquiry. The process of FIG. 6 occurs between initiating STA (e.g., mobile device) 602 and responding STA 604. The process is directed to non-ASAP FTM inquiry. That is, the ASAP indicator bit (e.g., bit 320, FIG. 3) is set to zero. The conventional process of FIG. 6 is substantially similar to the process shown in FIG. 4 and for brevity will not repeated. The process of FIG. 6 is conducted entirely over WiFi and is significantly power consumptive.

Figure 7:
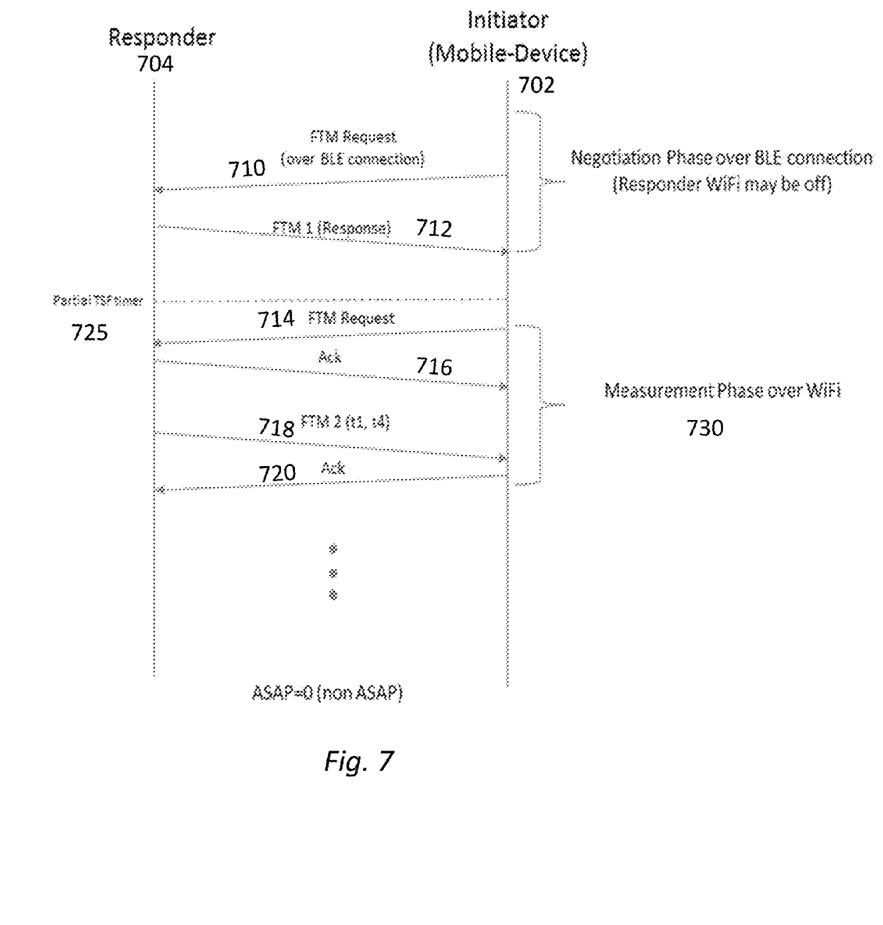
FIG. 7 illustrates timing structure for an exemplary hybrid FTM device according to one embodiment of the disclosure for a non-ASAP FTM inquiry.

FIG. 7 illustrates timing structure for an exemplary hybrid FTM device according to one embodiment of the disclosure for a non-ASAP FTM inquiry. The process of FIG. 7 may be implemented on a hybrid WiFi FTM/BLE responder in accordance with the disclosed principles. The process starts at step 710 when initiator 702 transmits an FTM request over a BLE connection to responder 704. At step 712, responder 704 transmits FTM-1 information to initiator 702. In one embodiment of the disclosure, FTM-1 may be communicated over a BLE connection. Once a partial TSF timer 725 starts, the initiator 702 and the responder 704 may continue communication the measurement communications over WiFi as shown in step 730.

Figure 8:
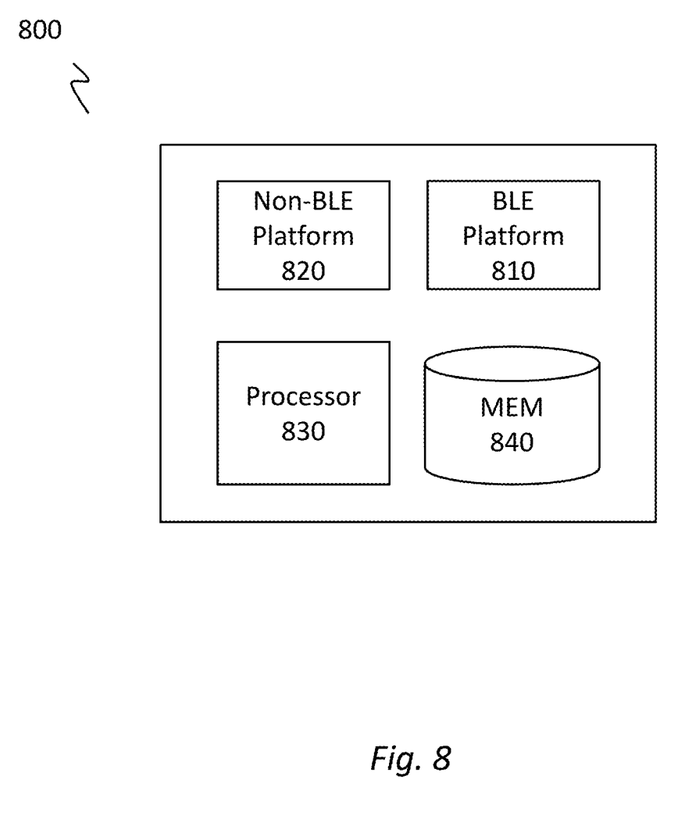
FIG. 8 is an exemplary hybrid WiFi FTM/BLE responder according to one embodiment of the disclosure.

FIG. 8 is an exemplary hybrid WiFi FTM/BLE responder according to one embodiment of the disclosure. The responder of FIG. 8 may comprise hardware, software or a combination of hardware and software. Responder 800 is shown with BLE communication platform 810 and non-BLE communication platform 820. Non-BLE communication platform may include one or more WiFi, WiGig, cellular or any other conventional communication platforms. Processor 830 may include processing circuitry to control communication functions as well as FTM functions of responder 800. For example, processor 830 may include a controller circuitry for switching between WiFi and BLE communication modes as needed and to engage in ToF/FTM calculations when requested.

Memory 840 may include instructions directing the processor to engage one or more of the communication platforms as needed. The instructions may include, for example, directing the WiFi communication platforms to go to deep sleep or Off mode when not active (i.e., low power mode). Similarly, the instruction may direct processor 830 negotiate FTM procedures over BLE connection. The instructions may further direct processor 830 to enabling low-power mode(s) for hybrid BLE/FTM responder 800 by keeping the WiFi receiver (e.g., platform 820) off when no clients are actively using the feature. The instructions may further enable responder 800 to operate in hybrid mode by maximizing use of the BLE Platform 810 while minimizing use of the non-BLE platform 820

The following examples further illustrate non-limiting embodiments of the disclosure. Example 1 is directed to a hybrid responder for Fine-Timing Measurement (FTM), comprising: a BLE platform to send and receive BLE packets to thereby communicate with a mobile device in a BLE mode; a WiFi platform to transceiver WiFi packets to communicate with the mobile device in a WiFi mode; a controller configured to (1) establish communication with the mobile device in BLE mode, (2) negotiate WiFi FTM procedure with the mobile device, and (3) conduct FTM measurements to perform proximity determination relating to the mobile device.

Example 2 is directed to the hybrid responder of claim A, wherein the controller is further configured to negotiate procedure to establish WiFi FTM determination with the mobile device in BLE mode.

Example 3 is directed to the hybrid responder of any preceding claim, further comprising reporting the WiFi FTM proximity determination result to the mobile device using the BLE platform.

Example 4 is directed to the hybrid responder of any preceding claim, wherein the controller further comprises a processing circuitry and a memory circuitry and wherein the memory circuitry includes instructions to direct the processing circuitry to establish communication in BLE and WiFi modes and to negotiate WiFi FTM procedure in BLE mode while the WiFi platform is at a power-saving mode.

Example 5 is directed to the hybrid responder of any preceding claim, wherein the controller is configured to establish communication with the mobile device by transmitting BLE advertisement and responding to the mobile device's request to establish BLE connection with the responder.

Example 6 is directed to the hybrid responder of any preceding claim, wherein the controller is further configured to switch to WiFi communication mode after the WiFi FTM procedure has been negotiated.

Example 7 is directed to the hybrid responder of any preceding claim, wherein the controller is further configured to continue the FTM procedure over BLE communication to obtain one or more measurement timers after WiFi FTM measurement has been made.

Example 8 is directed to the hybrid responder of any preceding claim, wherein the BLE platform is configured to periodically send BLE advertisement indicating WiFi FTM capability.

Example 9 is directed to a mobile device configured to conduct Fine-Timing Measurement (FTM) for location determination, comprising: a BLE platform to send and receive transceiver BLE packets to thereby communicate with a Responder station (Responder STA) in a BLE mode; a WiFi platform to send and receive WiFi packets to communicate with the Responder STA in a WiFi mode; a controller configured to (1) establish communication with the Responder STA in BLE mode, (2) negotiate WiFi FTM procedure with the Responder STA, and (3) receive FTM measurements to perform proximity determination relating to the mobile device.

Example 10 is directed to the mobile device of any preceding claim, wherein the controller is further configured to negotiate procedure to establish WiFi FTM determination with the mobile device in BLE mode.

Example 11 is directed to the mobile device of any preceding claim, further comprising receiving the WiFi FTM proximity determination result from the Responder STA through the BLE platform.

Example 12 is directed to the mobile device of any preceding claim, wherein the controller further comprises a processing circuitry and a memory circuitry and wherein the memory circuitry includes instructions to direct the processing circuitry to establish communication in BLE and WiFi modes with the Responder STA and to negotiate WiFi FTM procedure in BLE mode.

Example 13 is directed to the mobile device of any preceding claim, wherein the BLE platform is configured to periodically negotiate FTM parameters using the BLE platform.

Example 14 is directed to a non-transitory machine-readable medium comprising instruction executable by a processor circuitry to perform steps to determine location of a mobile device, the instructions direct the processor to: establish communication with the mobile device in a BLE communication mode; negotiate WiFi FTM procedure with the mobile device to substantially determine a location for the mobile device; establish communication with the mobile device in WiFi communication mode; using the negotiated FTM procedure, conduct FTM measurements in WiFi mode to perform proximity determination relating to the mobile device.

Example 15 is directed to the medium of any preceding claim, wherein the instructions further direct the processor to negotiate WiFi FTM procedure with the mobile device in BLE mode while the WiFi mode is in deep sleep or Off modes.

Example 16 is directed to the medium of any preceding claim, wherein the instructions further direct the processor to report the WiFi FTM location determination result to the mobile device using the BLE communication mode.

Example 17 is directed to the medium of any preceding claim, wherein the instructions further direct the processor to establish communication with the mobile device in response to the mobile device's request to establish BLE connection.

Example 18 is directed to the medium of any preceding claim, wherein the instructions further direct the processor to switch to WiFi communication mode after the WiFi FTM procedure has been negotiated.

Example 19 is directed to the medium of any preceding claim, wherein the instructions further direct the processor to continue the FTM procedure over the BLE communication mode to obtain one or more measurement timers after WiFi FTM measurement has been made.

Example 20 is directed to the medium of any preceding claim, wherein the instructions further direct the transmitting BLE advertisements indicating WiFi FTM capability.

Example 21 is directed to a method for proximity determination using Fine-Time Measurement (FTM) for a mobile device, the method comprising: establishing a BLE communication with the mobile device; negotiating WiFi FTM procedure with the mobile device to substantially determine a location for the mobile device; establishing WiFi communication with the mobile device; using the negotiated WiFi FTM procedure to conduct FTM measurements in WiFi mode to perform proximity determination relating to the mobile device.

Example 22 is directed to the method of any preceding claim, further comprising negotiating WiFi FTM procedure with the mobile device using BLE communication to substantially determine a location for the mobile device.

Example 23 is directed to the method of any preceding claim, further comprising negotiating WiFi FTM procedure with the mobile device in BLE mode while the WiFi mode is in power save mode.

Example 24 is directed to the method of any preceding claim, further comprising reporting the WiFi FTM proximity determination result to the mobile device using the BLE communication mode.

Example 25 is directed to the method of any preceding claim, further comprising establishing communication with the mobile device in response to the mobile device's request to establish BLE connection.

Example 26 is directed to the method of any preceding claim, further comprising switching to WiFi communication mode after the WiFi FTM procedure has been negotiated using BLE communication mode.

Example 27 is directed to the method of any preceding claim, further comprising continuing the FTM procedure over BLE communication mode to obtain one or more measurement timers WiFi FTM measurement has been made.

Example 28 is directed to the method of any preceding claim, further comprising periodically transmitting BLE advertisements wherein the advertisements indicate WiFi FTM capability.

Example 29 is directed to a Machine-Readable storage including machine-readable instructions, when executed, to implement a method or realize an apparatus as claimed in any preceding claim.

Example 30 is directed to an apparatus to determine Fine-Time Measurement to determine location of a mobile device, comprising: means for establishing a BLE communication with the mobile device; means for negotiating WiFi FTM procedure with the mobile device to substantially determine a location for the mobile device; means for establishing WiFi communication with the mobile device; means for using the negotiated WiFi FTM procedure to conduct FTM measurements in WiFi mode to perform proximity determination relating to the mobile device.

Example 31 is directed to the method of any preceding claim, further comprising negotiating WiFi FTM procedure with the mobile device using BLE communication to substantially determine a location for the mobile device.

Example 32 is directed to the method of any preceding claim, further comprising negotiating WiFi FTM procedure with the mobile device in BLE mode while the WiFi mode is in power save mode.

Example 33 is directed to the method of any preceding claim, further comprising reporting the WiFi FTM proximity determination result to the mobile device using the BLE communication mode.

Example 34 is directed to the method of any preceding claim, further comprising establishing communication with the mobile device in response to the mobile device's request to establish BLE connection.

Example 35 is directed to the method of any preceding claim, further comprising switching to WiFi communication mode after the WiFi FTM procedure has been negotiated using BLE communication mode.

While the principles of the disclosure have been illustrated in relation to the exemplary embodiments shown herein, the principles of the disclosure are not limited thereto and include any modification, variation or permutation thereof.

What is claimed is:

1. A hybrid responder for Fine-Timing Measurement (FM), comprising:
    a Bluetooth Low Energy ("BLE") platform to send and receive BLE packets to thereby communicate with a mobile device in a BLE mode;
    a WiFi platform to receive and to transmit WiFi packets to communicate with the mobile device in a WiFi mode;
    a controller configured to (1) establish communication with the mobile device in BLE mode, (2) negotiate WiFi FTM procedure with the mobile device, and (3) conduct FTM measurements to perform proximity determination relating to the mobile device.

2. The hybrid responder of claim 1, wherein the controller is further configured to negotiate procedure to establish WiFi FTM determination with the mobile device in BLE mode.

3. The hybrid responder of claim 1, further comprising reporting the WiFi FTM proximity determination result to the mobile device using the BLE platform.

4. The hybrid responder of claim 1, wherein the controller further comprises a processing circuitry and a memory circuitry and wherein the memory circuitry includes instructions to direct the processing circuitry to establish communication in BLE and WiFi modes and to negotiate WiFi FTM procedure in BLE mode while the WiFi platform is at a power-saving mode.

5. The hybrid responder of claim 1, wherein the controller is configured to establish communication with the mobile device by transmitting BLE advertisement and responding to the mobile device's request to establish BLE connection with the responder.

6. The hybrid responder of claim 1, wherein the controller is further configured to switch to WiFi communication mode after the WiFi FTM procedure has been negotiated.

7. The hybrid responder of claim 1, wherein the controller is further configured to continue the FTM procedure over BLE communication to obtain one or more measurement timers after WiFi FTM measurement has been made.

8. The hybrid responder of claim 1, wherein the BLE platform is configured to periodically send BLE advertisement indicating WiFi FTM capability.

9. A mobile device configured to conduct Fine-Timing Measurement (FTM) for location determination, comprising:
    a Bluetooth Low Energy ("BLE") platform to send and receive transceiver BLE packets to thereby communicate with a Responder station (Responder STA) in a BLE mode;
    a WiFi platform to send and receive WiFi packets to communicate with the Responder STA in a WiFi mode;
    a controller configured to (1) establish communication with the Responder STA in BLE mode, (2) negotiate WiFi FTM procedure with the Responder STA, and (3) receive FTM measurements to perform proximity determination relating to the mobile device.

10. The mobile device of claim 9, wherein the controller is further configured to negotiate procedure to establish WiFi FTM determination with the mobile device in BLE mode.

11. The mobile device of claim 9, further comprising receiving the WiFi FTM proximity determination result from the Responder STA through the BLE platform.

12. The mobile device of claim 9, wherein the controller further comprises a processing circuitry and a memory circuitry and wherein the memory circuitry includes instructions to direct the processing circuitry to establish communication in BLE and WiFi modes with the Responder STA and to negotiate WiFi FTM procedure in BLE mode.

13. The mobile device of claim 9, wherein the BLE platform is configured to periodically negotiate FTM parameters using the BLE platform.

14. A non-transitory machine-readable medium comprising instruction executable by a processor circuitry to perform steps to determine location of a mobile device, the instructions direct the processor to:
- establish communication with the mobile device in a Bluetooth Low Energy ("BLE") communication mode;
- negotiate WiFi FTM procedure with the mobile device to substantially determine a location for the mobile device;
- establish communication with the mobile device in WiFi communication mode;
- using the negotiated FTM procedure, conduct FTM measurements in WiFi mode to perform proximity determination relating to the mobile device.

15. The medium of claim 14, wherein the instructions further direct the processor to negotiate WiFi FTM procedure with the mobile device in BLE mode while the WiFi mode is in deep sleep or Off modes.

16. The medium of claim 14, wherein the instructions further direct the processor to report the WiFi FTM location determination result to the mobile device using the BLE communication mode.

17. The medium of claim 14, wherein the instructions further direct the processor to establish communication with the mobile device in response to the mobile device's request to establish BLE connection.

18. The medium of claim 14, wherein the instructions further direct the processor to switch to WiFi communication mode after the WiFi FTM procedure has been negotiated.

19. The medium of claim 14, wherein the instructions further direct the processor to continue the FTM procedure over the BLE communication mode to obtain one or more measurement timers after WiFi FTM measurement has been made.

20. The medium of claim 14, wherein the instructions further direct the transmitting BLE advertisements indicating WiFi FTM capability.

21. A method for proximity determination for a mobile device by using Fine-Time Measurement (FTM), comprising:
- establishing a Bluetooth Low Energy ("BLE") communication with the mobile device;
- negotiating WiFi FTM procedure with the mobile device to substantially determine a location for the mobile device;
- establishing WiFi communication with the mobile device;
- using the negotiated WiFi FTM procedure to conduct FTM measurements in WiFi mode to perform proximity determination relating to the mobile device.

22. The method of claim 21, further comprising negotiating WiFi FTM procedure with the mobile device using BLE communication to substantially determine a location for the mobile device.

23. The method of claim 21, further comprising negotiating WiFi FTM procedure with the mobile device in BLE mode while the WiFi mode is in power save mode.

24. The method of claim 21, further comprising reporting the WiFi FTM proximity determination result to the mobile device using the BLE communication mode.

25. The method of claim 21, further comprising establishing communication with the mobile device in response to the mobile device's request to establish BLE connection.

26. The method of claim 21, further comprising switching to WiFi communication mode after the WiFi FTM procedure has been negotiated using BLE communication mode.

27. The method of claim 21, further comprising continuing the FTM procedure over BLE communication mode to obtain one or more measurement timers WiFi FTM measurement has been made.

28. The method of claim 21, further comprising periodically transmitting BLE advertisements wherein the advertisements indicate WiFi FTM capability.

* * * * *